United States Patent [19]

Kobayashi

[11] Patent Number: 5,124,968
[45] Date of Patent: Jun. 23, 1992

[54] OPTICAL DISC APPARATUS AND THE METHOD FOR REPRODUCING ITS CLOCK SIGNALS

[75] Inventor: Seiji Kobayashi, Kanagawa, Japan

[73] Assignee: Sony Corporation, Tokyo, Japan

[21] Appl. No.: 449,927

[22] PCT Filed: Apr. 19, 1989

[86] PCT No.: PCT/JP89/00421

§ 371 Date: Dec. 20, 1989

§ 102(e) Date: Dec. 20, 1989

[87] PCT Pub. No.: WO89/10613

PCT Pub. Date: Nov. 2, 1989

[51] Int. Cl.⁵ .............................................. G11B 20/10
[52] U.S. Cl. ................................................... 369/59
[58] Field of Search ........................................ 369/57

[56] References Cited

FOREIGN PATENT DOCUMENTS

| | | |
|---|---|---|
| 0144813 | 6/1985 | European Pat. Off. . |
| 0158219 | 10/1985 | European Pat. Off. . |
| 0193153 | 9/1986 | European Pat. Off. . |
| 0200370 | 11/1986 | European Pat. Off. . |
| 56-66947 | 6/1981 | Japan . |
| 59-217217 | 7/1984 | Japan . |
| 61-261873 | 11/1986 | Japan . |
| 63-8369 | 1/1987 | Japan . |
| 63-311665 | 12/1988 | Japan . |
| 63-113873 | 5/1989 | Japan . |
| 2109203 | 5/1983 | United Kingdom . |

OTHER PUBLICATIONS

*Digital Logic and Computer Design* by M. Morris Mano, Prentice Hall Inc., pp. 207, 208.

*Primary Examiner*—Vincent P. Canney
*Attorney, Agent, or Firm*—Hill, Van Santen, Steadman & Simpson

[57] ABSTRACT

According to the present invention, a detection signal $S_{k1}$ whose signal level rises or falls in a period longer by a predetermined period of 0.5T than the period T of a clock signal $S_{CK}$ is generated on the basis of a reproduction signal $S_{RF}$ obtained from an optical disc on the recording tracks of which recording patterns are recorded with a predetermined period, and this detection signal $S_{k1}$ is acquired at the timing of the clock signal described above to obtain a plurality of recording pattern detection signals $S_{p1}$ by sequentially representing the signal level of the detection signal $S_{CK}$ during a predetermined period by the period T of the clock signal described above. The recording pattern is detected except for part of the plurality of recording pattern detection signals $S_{p1}$.

10 Claims, 7 Drawing Sheets

SIGNAL WAVEFORM DIAGRAM

FIG. 7

SIGNAL WAVEFORM DIAGRAM

FIG. 8

SIGNAL WAVEFORM DIAGRAM

FIG. 9

OPTICAL DISC APPARATUS AND THE METHOD FOR REPRODUCING ITS CLOCK SIGNALS

TECHNICAL FIELD

This invention relates to an apparatus for producing clock signals on the basis of a recording pattern formed at a predetermined period on a recording track, and a method for reproducing the clock signals.

BACKGROUND OF ART

In an optical disc apparatus in which clock signals are obtained on the basis of the recording pattern formed at a predetermined period on an optical disc, there is known an apparatus in which clock signals are produced on the basis of the recording pattern recorded at a predetermined period on an optical disc, referred to hereinafter as the servo pattern, and signal recording and reproduction are performed using the clock signals as the reference.

Figure 1:
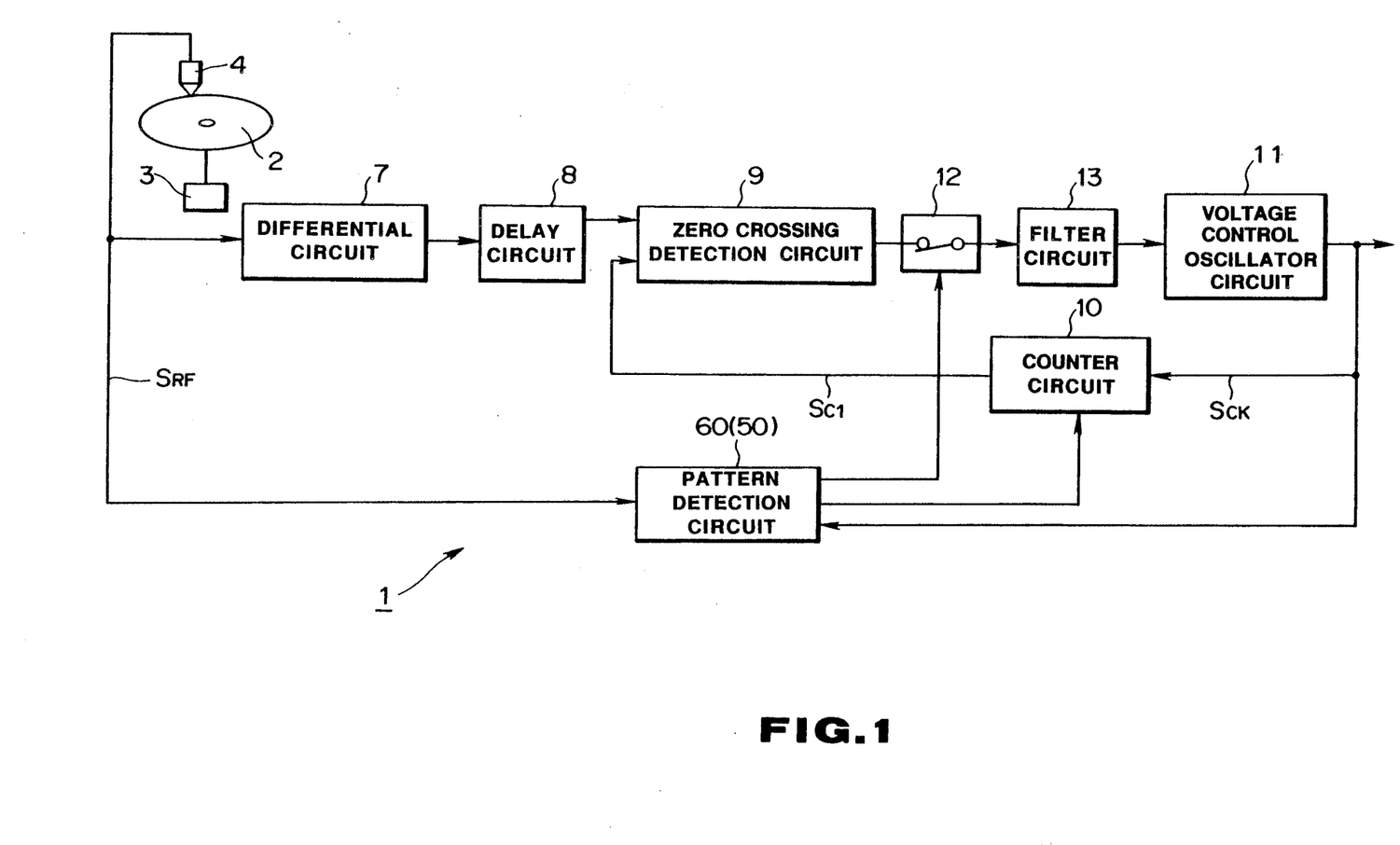
FIG. 1 is a block diagram showing the overall arrangement of the optical disc apparatus recording to the present invention.
Figure 2:
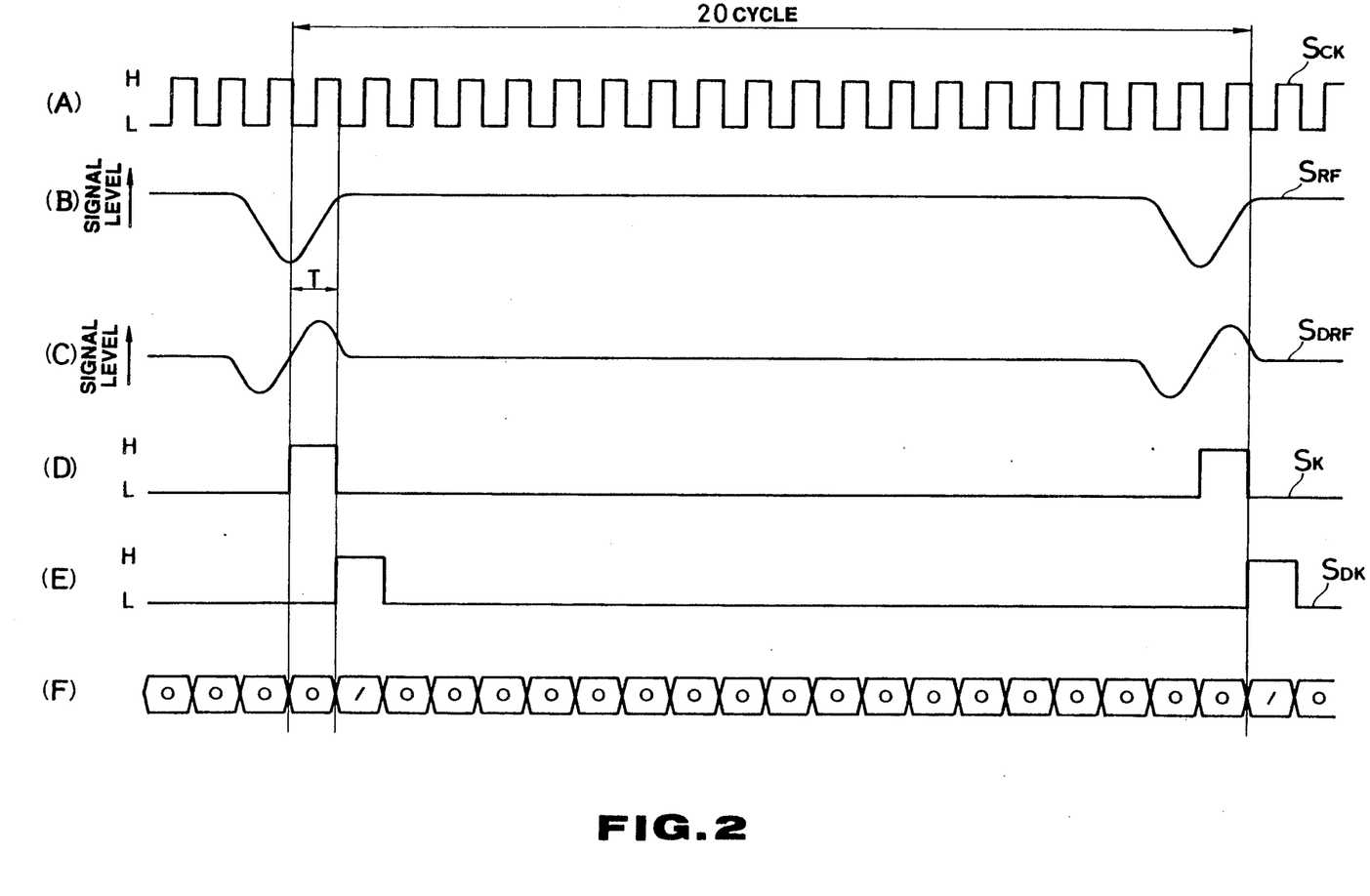

This type of optical disk apparatus 1 is shown for example in FIGS. 1 and 2, wherein an optical disc 2, on the recording tracks of which the servo patterns are formed at a predetermined period, is rotated at a reference rotational speed by a spindle motor 3.

The servo pattern is formed by forming pits at a predetermined interval on the recording tracks of the optical disc 2. The servo pattern is so set that, when the optical disc 2 is rotated at a predetermined rotational speed, the interval between the bits is equal to 18 periods of a predetermined reference time $T_{REF}$, or 18 $T_{REF}$.

An optical head 4 irradiates the optical disc 2 with a light beam and receives the reflected light by a detection element to produce a reproduction signal $S_{RF}$, shown at B in FIG. 2, having its signal level falling in accordance with the pit formed on the optical disc 2. The optical head 4 outputs this reproduction signal $S_{RF}$ to a pattern detection circuit 6, while outputting the reproduction signal $S_{RF}$ to a zero crossing detection circuit 9 by way of differentiating circuit 7 and a delay circuit 8.

The zero-crossing circuit 9 receives from a counter circuit 10 a switching signal $S_{C1}$ which goes to a logically high level during 20 periods of the clock signal $S_{CK}$, or 20 T, each time 270 clock signals are counted at the counter circuit 10. An output signal is then obtained which rises in signal level at the time the differentiation signal of the reproduction signal $S_{RF}$ rises from 0 V and during the time interval of 20 T in which the aforementioned switching signal $S_{C1}$ is at the logically high level.

A voltage controlled oscillator circuit 11 receives an output signal of the zero-crossing detection circuit 9 by way of a switching circuit 12 and a filter circuit 13, while outputting the oscillation output signal as the aforementioned clock signal $S_{CK}$. The voltage controlled oscillator circuit 11 constitutes, in conjunction with the aforementioned zero-crossing detection circuit 9, the switching circuit 12, the filter circuit 13 and the counter circuit 10, a phase locked loop (PLL) circuit which fetches the reproduction signal $S_{RF}$ at a period 270 times the aforementioned clock signal $S_{CK}$, during the time equal to 20 periods of the clock signal $S_{CK}$, or 270 T, and outputs the clock signal $S_{CK}$ on the basis of the phase data of the reproduction signal $S_{RF}$.

The frequency dividing ratio 270 is so set that, when the period T of the clock signal $S_{CK}$ coincides with the reference period $T_{REF}$ indicating the pit-to-pit interval, the period 270 T at which the PLL clock acquires or fetches the reproduction signal $S_{RF}$ coincides with the repetition period of the servo pattern, and that the period 20 T of acquiring or fetching the reproduction signal $S_{RF}$ coincides with the time interval since the acquisition of the reproduction signal $S_{RF}$ of the first pit of the servo voltage until the acquisition of the reproduction signal $S_{RF}$ of the next following pit as shown in FIG. 2B.

Once the period T of the clock signal $S_{CK}$ coincides with the reference period $T_{REF}$, there is obtained the clock signal $S_{CK}$ which is phase locked to the reference period $T_{REF}$ on the basis of the servo pattern.

Thus, in the present optical disc apparatus 1, the servo pattern is first detected in the pattern detection circuit 6, the counter circuit 10 is initialized on the basis of the detection results, and the frequency dividing operation of the counter circuit 10 is performed repeatedly.

In addition, in the present optical disc apparatus 1, by detecting the defect in a servo pattern with the aid of the pattern detection circuit 6, phase locking of the clock signal $S_{CK}$ is not disengaged despite occasional injuries, deviation or offset of the optical disc 2.

That is, although the pit-to-pit interval is formed in the optical disc 2 so as to be equal to 18 periods of the reference period $T_{REF}$, or 18 $T_{REF}$, defects which may occur cause the pit-to-pit interval to be not equal to 18 $T_{REF}$ or no pit is formed in the region corresponding to 18 $T_{REF}$. If the reproduction signal $S_{REF}$ is fetched from such defective servo pattern, the period of the clock signal $S_{CK}$ which has so far been phase locked with respect to the reference period $T_{ref}$ is disturbed, and renders the correct data recording and reproduction difficult.

Figure 3:
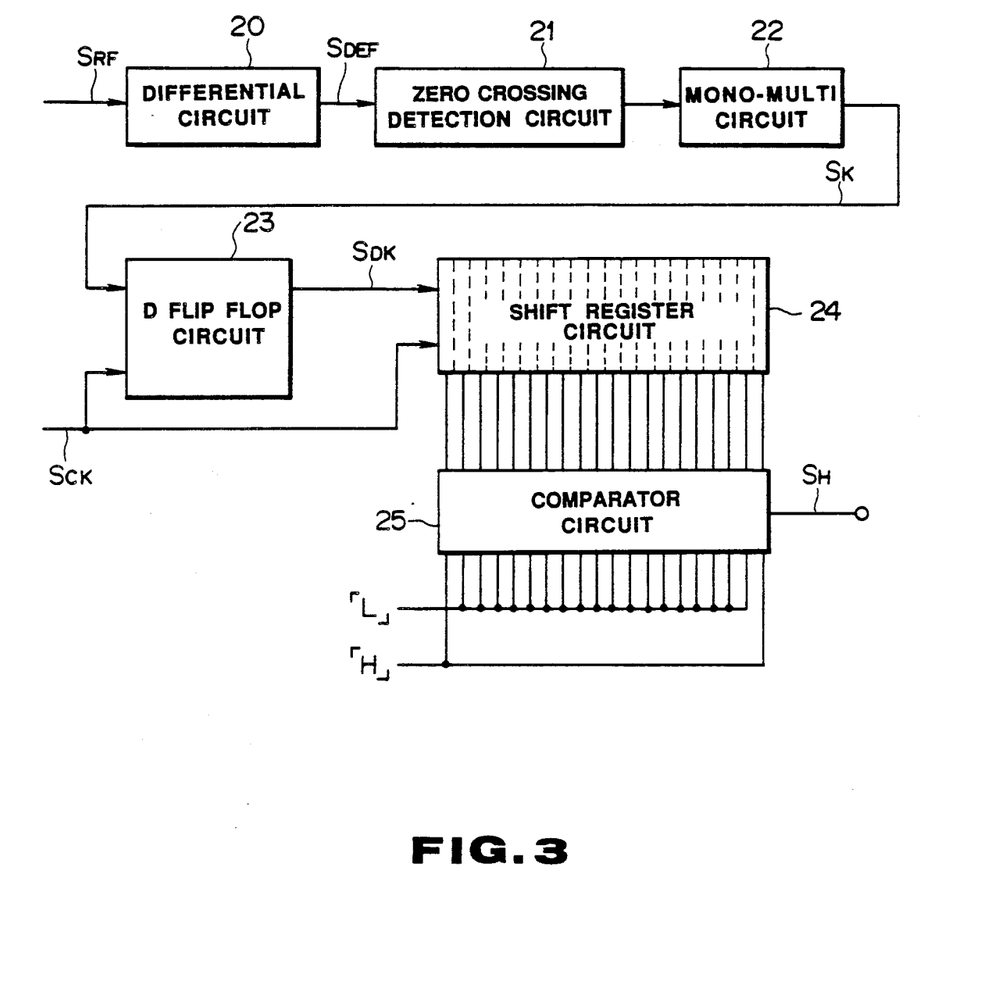
FIG. 3 is a block diagram showing a conventional circuit arrangement of a pattern detection circuit employed in the above optical disc apparatus.

Thus, with the present optical disc apparatus 1, referring to FIG. 3 showing the detailed structure of the pattern detection circuit 6, the reproduction signal $S_{RF}$ is applied to a differentiating circuit 20 to produce a differentiation signal $S_{DEF}$ shown at C in FIG. 2, which differentiation signal $S_{DEF}$ is applied to a zero-crossing detection circuit 21.

This zero-crossing circuit 21 is so arranged that, when the signal level of the differentiation signal $S_{DEF}$ rises from 0 V, its output signal rises in level, and, when the reproduction signal $S_{RF}$ is lowered in level, an output signal which rises in level at the timing of the lowest level of the reproduction signal $S_{RF}$ is applied to a monostable multivibrator circuit 22.

This monostable multivibrator circuit 22 is so arranged that its signal level becomes logically high during a time interval equal to the period of the clock signal $S_{CK}$ at the rising timing of the output signal of the zero-crossing circuit 21, so that a detection signal $S_{CK}$ shown at D in FIG. 2 is obtained, which falls in signal level to a logically low level after lapse of the time interval T equal to the clock period, because of the rising to the logically high level of the reproduction signal $S_{RF}$.

Thus the differentiation circuit 20, the zero-crossing detection circuit 21 and the monostable multivibrator circuit 22 constitute waveform shaping means for outputting the detection signal $S_K$ which rises in signal level at the period of the clock signal $S_{CK}$ on the basis of the reproduction signal $S_{RF}$ acquired from the optical disc 2.

The detection signal $S_K$, produced at the aforementioned monostable multivibrator 22, is input to a shift register circuit 24, as a detection signal $S_{DK}$ delayed by the time interval T equal to one period of the clock signal $S_{CK}$, by way of a D flip-flop circuit 23, producing a signal in timed relation with the clock signal $S_{CK}$.

The aforementioned shift register circuit 24 is formed by a 20-stage flip flop circuit adapted to sequentially transfer the input signal in timed relation with the clock signal $S_{CK}$. As the output signals of the respective stages of the flipflop circuit, there are produced a plurality of recording pattern detection signals $S_P$ in which the signal level of the detection signal $S_K$ is sequentially represented, during the time interval 20 T equal to 20 period of the clock signals $S_{CK}$, with the period T of the clock signal $S_{CK}$.

The shift register circuit 24 is adapted for outputting the reference pattern detection signal $S_P$ from the 20-stage flipflop circuit to a comparator circuit 25, in time relation with the clock signals $S_{CK}$. The comparator circuit 25 is adapted to compare a preset signal pattern with the recording pattern detection signal $S_P$ output from the shift register circuit 24 to detect the predetermined servo pattern.

The comparator circuit 25 outputs, when the recording pattern detection signal $S_P$ output from the last stage flip flop circuit and the first stage flip flop circuit of the shift register circuit 24 are at the logically high level and the recording pattern detection signals $S_P$ output from the intermediate stages are at the logically low level, a detection signal $S_H$ to the switching circuit 12 shown in FIG. 1, which detection signal $S_H$ rises to a logically high level only during the time interval 20 T corresponding to the 20 periods of the clock signals $S_{CK}$.

Thus, when the time interval which elapses since acquisition of the reproduction $S_{RF}$ for one pit until acquisition of the reproduction signal $S_{RF}$ of the next following pit coincides with the time period during which the input signal to the shift register circuit 23 is transferred to the last stage flip flop circuit, that is the time interval 20 T corresponding to 20 periods of the clock signal $S_{CK}$, the detection signal $S_H$ produced by the comparator circuit 25 rises to a logically high level.

At this time, if the time interval T of the clock signal $S_{CK}$ coincides with the reference period $T_{REF}$, the servo pattern may be thought to be free of defects, as shown at F in FIG. 2, since the pit-to-pit interval of the servo pattern is formed by pits of the time period 18 $T_{REF}$ corresponding to the 18 predetermined reference periods. The aforementioned switching circuit 12 is turned on only at this time to transmit the reproduction signal $S_{RF}$ to the $P_{LL}$ circuit, in such a manner that the reproduction signal $S_R$ of the defective servo pattern is not applied to the PLL circuit.

Thus the aforementioned D flip flop circuit 23, the shift register circuit 24 and the comparator 25 constitute recording pattern detection means whereby the detection signal $S_K$ is fetched at the timing of the clock signal $S_{CK}$ to produce a plurality of recording pattern detection signals $S_P$ in which the signal level of the detection signal $S_K$ during the time interval 20T corresponding to the 20 periods of the clock signal $S_{CK}$ is sequentially represented with the periods of the clock signal $S_{CK}$, and these recording pattern detection signals $S_P$ are then used for detecting the servo pattern.

In this manner, the phase of the clock signal $S_{CK}$ may be maintained at the reference period $T_{REF}$ to assure positive data recording and reproduction.

Figure 4:
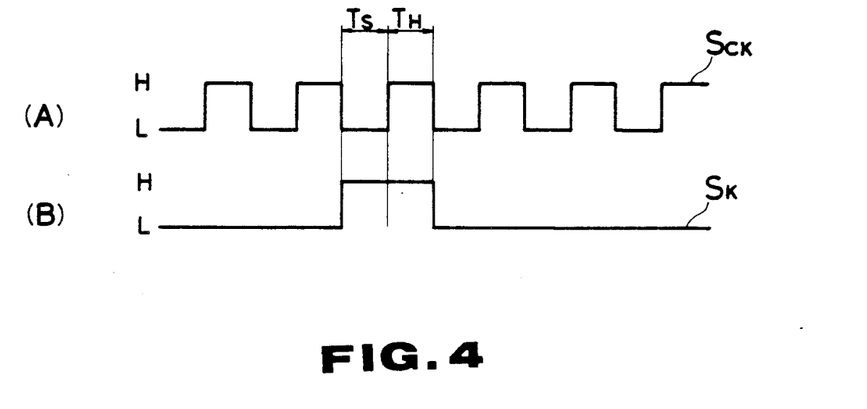

Meanwhile, with the above described optical disc apparatus 1, referring to FIG. 4A showing the clock signal $S_{CK}$ and to FIG. 4B showing the detection signal $S_{CK}$, in order for the detection signal $S_K$ (obtained at the monostable multivibrator circuit 22) to be fetched positively at the flipflop circuit 23, it is necessary that the time interval $T_S$ (FIG. 4) which elapses since rising of the detection signal $S_K$ until rising of the clock signal $S_{CK}$ be longer than the setup time of the flipflop circuit 23, and that the time interval $T_H$ which elapses since the rising of the clock signal $S_{CK}$ until the falling of the detection signal $S_K$ be longer than the hold time of the D flip flop circuit 23.

However, in effect, with this type of the optical disc apparatus the period T of the clock signal $S_{CK}$ is about 90 nsec, whereas the servo pattern repetition period is as long as 270 times the clock period T, or 270T, while the pit-to-pit interval of the servo pattern is as long as 18 clock period T, or 18T, so that it may occur, during the time which elapses since fetching a servo pattern until fetching the next following servo pattern, the rising timing of the clock $S_{CK}$ is changed by about 40 nsec with respect to the rising of falling timing of the detection signal $S_K$.

Figure 5:
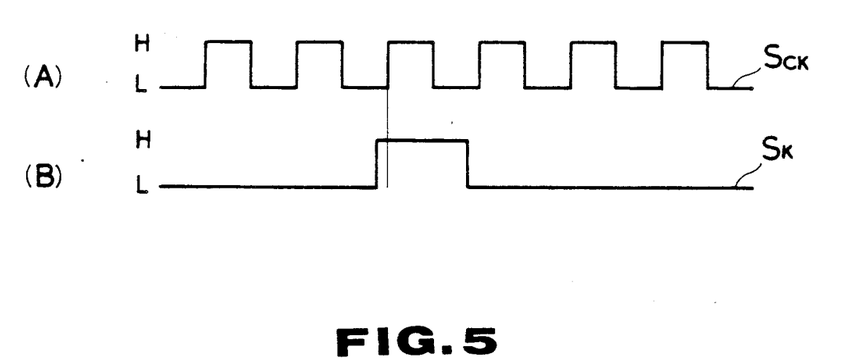

In this case, referring to FIG. 5A showing the clock signal $S_{CK}$ and to FIG. 5B showing the detection signal $S_K$, the rising or falling timing of the detection signal $S_K$ approaches the rising timing of the clock signal $S_{CK}$, so that it becomes difficult to obtain a sufficient setup time or hold time, such that the detection signal $S_C$ cannot be fetched positively.

In this case, even with a defectless servo pattern, it becomes difficult to obtain a detection signal $S_H$ from the pattern detection circuit 6 and to compensate for changes in the clock signal $S_{CK}$ with respect to the reference period $T_{REF}$.

As a result, phase shift or deviation of the clock signal $S_{CK}$ cannot be compensated with respect to the aforementioned reference period $T_{REF}$, so that the phase deviation tends to be increased gradually until the data cannot be recorded or reproduced reliably.

Above all, when the rotational speed of the optical disc is increased to shorten the reference period, only the slight phase deviation of the clock signal $S_{CK}$ cannot be corrected, such that, the higher the data recording density on the recording tracks, the more readily may occur the state in which such phase deviation can no longer be corrected.

In view of the foregoing, it is an object of the present invention to provide an optical disc apparatus in which the phase deviation of the clock signal can be corrected reliably, and the method for reproducing its clock signals.

DISCLOSURE OF THE INVENTION

For accomplishing the above object, the present invention provides an optical disc apparatus in which a recording pattern recorded at a predetermined period on recording tracks is detected to produce clock signals, comprising waveform shaping means for outputting a detection signal which rises or falls in signal level for a time interval longer, by a time period than the period, of said clock signal, and recording pattern detection means for fetching said detection signal at the timing of said clock signal to produce a plurality of recording pattern detection signals, in which the signal level of said detection signal for a predetermined period of time is sequentially represented with the periods of said clock signals, said recording pattern detection means detecting said reference pattern except for part of said plurality of recording pattern detection signals.

For accomplishing the above object, the present invention also provides a method for reproducing clock signals in an optical disc apparatus in which the reference pattern recorded at a predetermined period on recording tracks of an optical disc is detected to produce clock signals; comprising the steps of generating a detection signal which rises or falls in signal level for a time interval longer by a predetermined time period than the period of said clock signal, based on signals reproduced from the optical disc, fetching said detection signal at the time of said clock signal to produce a plurality of recording pattern detection signals in which the signal level of said detection signal for a predetermined period of time is sequentially represented by the periods of said clock signal, and detecting said recording pattern except for part of said plurality of recording pattern detection signals.

BRIEF DESCRIPTION OF THE DRAWINGS

FIG. 2A through F are a waveforms diagram for illustrating the principle of a general servo pattern detection in the above optical disc apparatus;

FIGS. 4A and B and 5A and B are waveform diagrams for illustrating certain inconveniences in the pattern detection operation in the above pattern detection circuit;

FIG. 7A through E are waveforms diagram for illustrating the principle of the servo pattern detection operation by the above pattern detection circuit; and FIGS. 8A through D and 9A through D are waveform diagrams for illustrating the operation of the above pattern detection circuit.

BEST EMBODIMENT OF PRACTICING THE INVENTION

An embodiment of the present invention is hereinafter explained by referring to the drawings.

Figure 6:
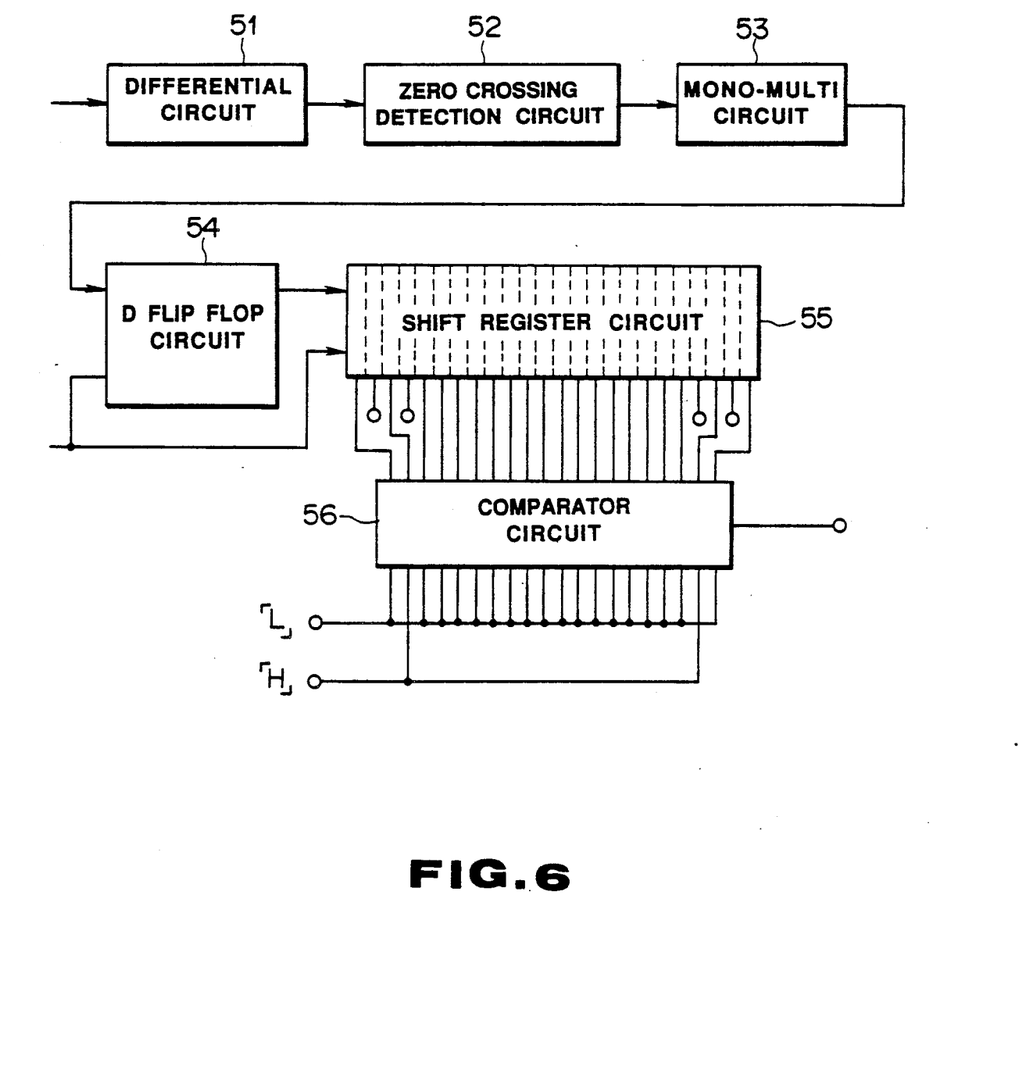
FIG. 6 is a block diagram showing a detailed structure of a pattern detection circuit forming an embodiment in which the present invention is applied to the optical disc apparatus shown in FIG. 1.

The block diagram of FIG. 6 shows an arrangement of a pattern detection circuit 50 in which the present invention is applied to an optical disc apparatus 1 shown in FIGS. 1 and 2.

This pattern detection circuit 50 is made up of a differentiating circuit 51, fed with a reproduced signal $S_{RF}$ of the optical disc apparatus, a zero-crossing detection circuit 52 fed with the differentation signal $S_{DEF}$ produced at the differentiating circuit 51, a monostable multivibrator circuit 53 triggered by a zero crossing detection signal produced by a zero-crossing detection circuit 52, a shift register circuit 55 fed with a detection signal $S_{k1}$ produced at the monostable multivibrator circuit 53 by way of a D flip flop circuit 54, and a comparator circuit 56 for comparing a reference pattern detection signal $S_P$ produced by the shift register circuit 55 with the preset predetermined period pattern to detect the predetermined servo pattern.

Figure 7:
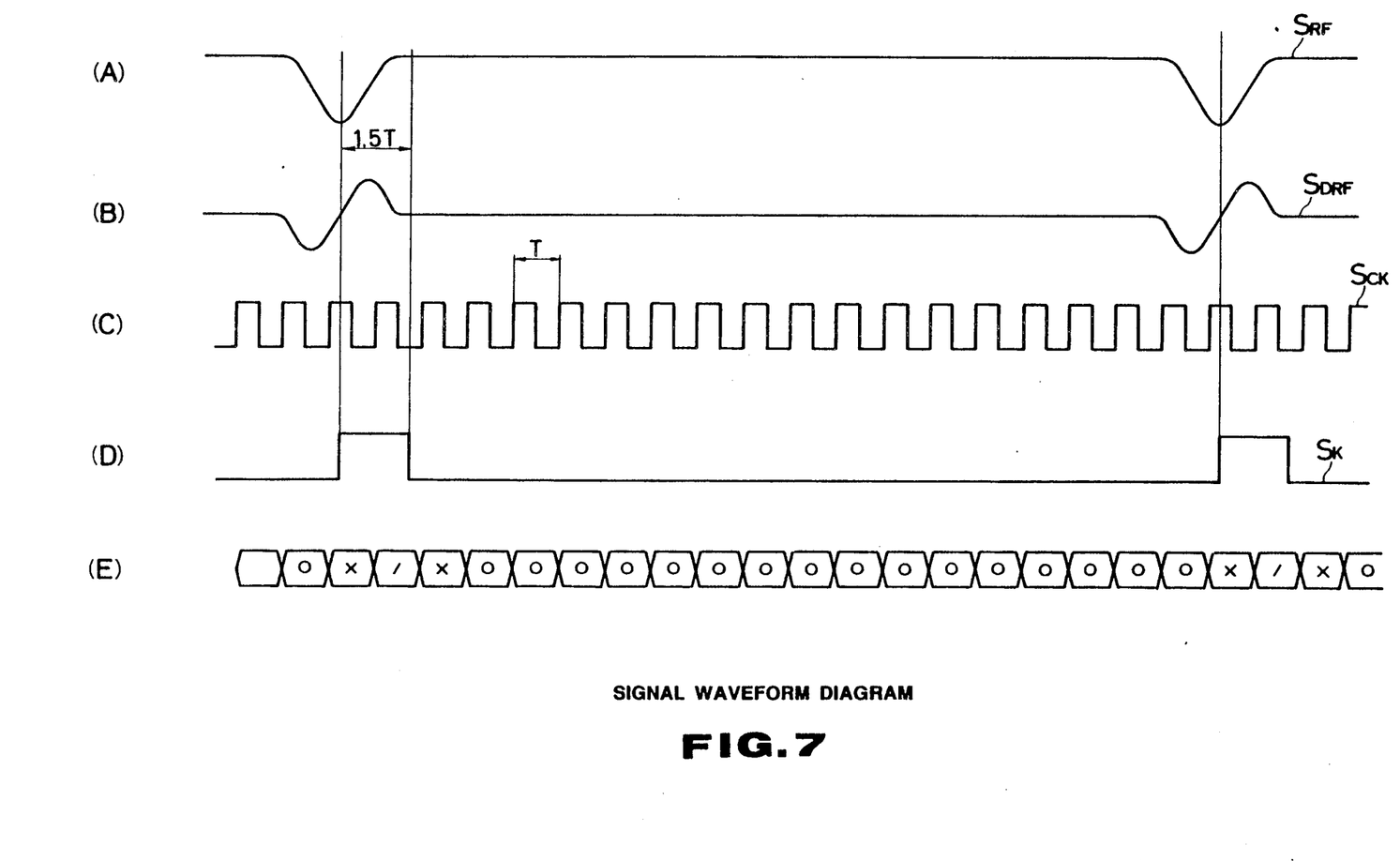

The zero-crossing circuit 52 is so arranged that its signal level rises when the signal level of the differentiation signal $S_{DEF}$ obtained at the differentiation circuit 51 rises from 0 V, when the signal level of the reproduced signal $S_{RF}$ falls, as shown at A in FIG. 7, the zero-crossing point of the differentiation signal $S_{DEF}$, shown at B in FIG. 7, obtained at the differentiating circuit 51, is detected, and an output signal which rises at the time of the lowest level point of the reproduced signal $S_{RF}$ is supplied to the monostable multivibrator circuit 53.

The signal level of the monostable multivibrator 53 is adapted to rise to a logically high level, at the rising time of the output signal of the zero-crossing detection circuit 52, during the time period equal to 1.5 periods of the clock signal $S_{CK}$ shown at C in FIG. 7, or 1.5 T, whereby there is produced a detection signal $S_{k1}$, shown at D in FIG. 7, the signal level of which rises to the logically high level at the timing of the lowest signal level of the reproduced signal $S_{RF}$ and, after the lapse of 1.5 clock periods, or 1.5 T, falls to a logically low level.

With the use of such monostable multivibrator circuit 53, the aforementioned detection signal $S_{k1}$ may be positively fetched by the shift register circuit 55 by way of the D flip flop circuit 54 to detect the servo pattern as shown at E in FIG. 7, even if the rising of the clock signal $S_{CK}$ is changed by about 40 nsec with respect to the rising or falling timing of the detection signal $S_{k1}$.

Figure 8:
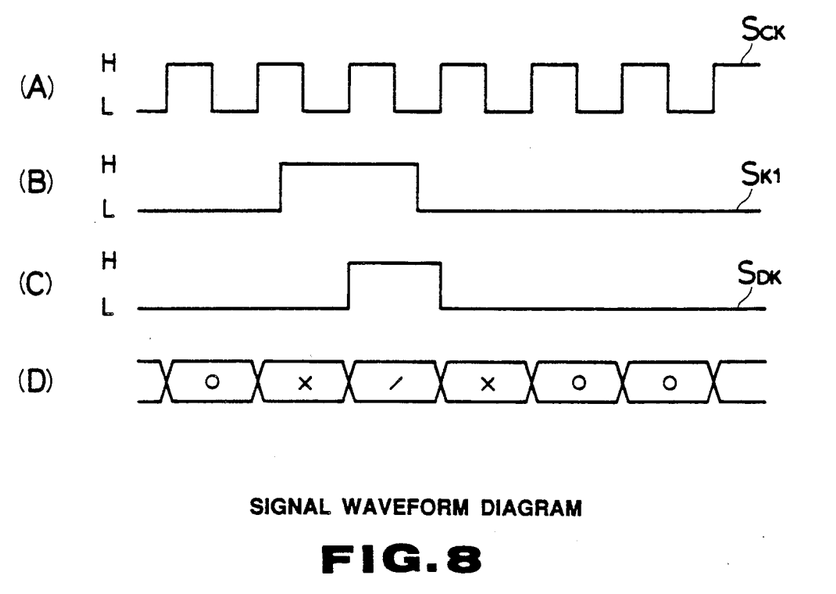

That is, as shown in FIG. 8, when the clock signal $S_{CK}$ shown at A in FIG. 8 rises with a delay of about 0.75 T with respect to the rising time of the detection signal $S_{k1}$ shown at B in FIG. 8, a detection signal $S_{DK}$, is produced shown at C in FIG. 8, the signal level of which rises to a logically high level at the rising time of the clock signal $S_{CK}$ and falls after lapse of the clock period T, as the output from the D flip flop circuit 54.

Figure 9:
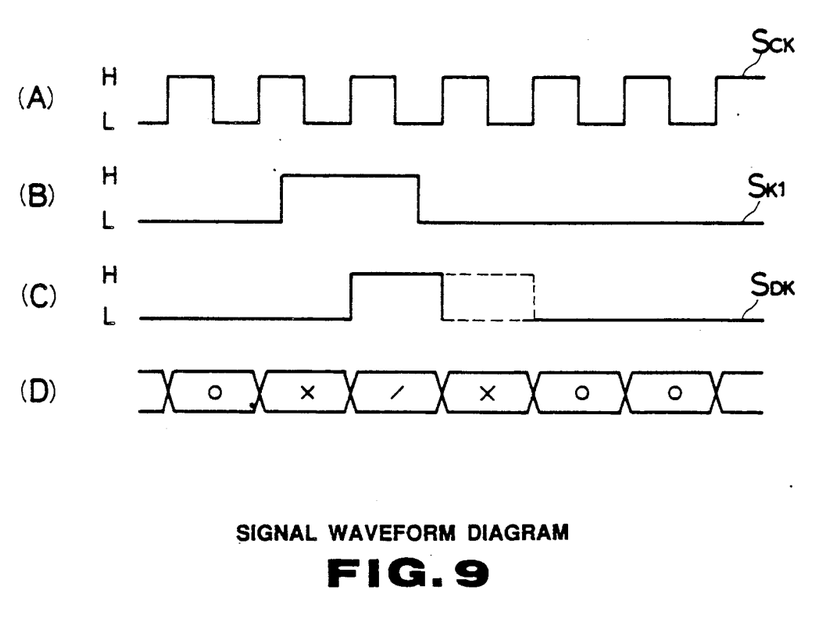

On the other hand, as shown in FIG. 9, when the clock signal $S_{CK}$ shown at A in FIG. 9 is advanced by about 40 nsec relative to the rising time of the detection signal $S_{k1}$ is produced, shown at B in FIG. 9, the detection signal $S_{DK}$, shown at C in FIG. 9, the signal level of which rises to the logically high level at the rising time of the clock signal $S_{CK}$ and then falls after lapse of the clock period T, as the output of the D flip flop circuit 54.

Similarly, in the case of a delay of about 40 nsec with respect to the rising timing of the detection signal $S_{k1}$, the detection signal $S_{DK}$ which rises in signal level to a logically high level at the rising time of the clock signal $S_{CK}$ and falls after lapse of the clock period T may be obtained as the output of the D flip flop circuit 54.

In this manner, the differentiating circuit 51, the zero-crossing circuit 52 and the monostable multivibrator circuit 53 make up waveform shaping means for outputting the detection signal $S_{k1}$, the signal level of which rises for a time period equal to 0.5 clock period, based on the reproduced signal $S_{RF}$ from the optical disc, wherein T designates the period of the clock signal $S_{CK}$.

When the time period during which the signal level of the detection signal $S_{k1}$ rises to the logically high level is set so as to be 1.5 times the clock period T, it may occur that, in case of fluctuations in the phase of the clock signal $S_{CK}$, the detection signal $S_{DK}$ is obtained as the output of the D flip flop circuit 54, which detection signal rises to a logically high level during the one period of the clock signal $S_{CK}$ and is maintained at the logically high level during the ensuing one period.

In the present embodiment, the shift register 55 is formed by a 24-stage flip flop circuit and the detection signal $S_{DK}$ is fetched by the shift register circuit 55 during 24 clock periods T or 24T, in such a manner that a plurality of recording pattern detection signals $S_{Pl}$, in which the signal levels of the detection signals $S_{DK}$ during the time interval of the 24 clock periods are sequentially represented with the periods of the clock signals $S_{CK}$, are supplied from the shift register circuit 55 to the comparator circuit 56.

The comparator circuit 56 receives the plurality of recording pattern detection signals $S_{Pl}$ produced at the shift register circuit 55 and outputs a detection signal $S_H$ which rises in signal level to the logically high level for the servo pattern shown at E in FIG. 7, in which the recording pattern detection signal $S_{Pl}$ output from the leading stage flip flop circuit of the shift register circuit 55 is at the "L" level, the recording pattern detection signal $S_{Pl}$ output from the third stage flip flop circuit as counted from the leading stage is at the "H" level, the recording pattern detection signals $S_{Pl}$ output from the 5th to the 20th stages as counted from the leading stage are at the "H" level and the recording pattern detection signal $S_{Pl}$ output from the 24th or last stage flipflop circuit is at the "L" level.

The comparator circuit 56 detects, on the basis of the recording pattern detection signals $S_{Pl}$ outputted from other than the 2nd, 4th, 21th and 23rd stage flip flop circuits, from among the recording pattern detection signals $S_{Pl}$ obtained at the shift register circuit 55, whether or not the servo pattern is the correct one as shown in FIGS. 8 and 9, and outputs the detection signal $S_H$ indicating the results of detection.

The switching circuit 12 of the optical disc apparatus shown in FIG. 1 is turned on by the detection signal $S_H$ produced at the comparator circuit 56 to supply the reproduced signal $S_{RF}$ to the PLL circuit so that the reproduced signal $S_{RF}$ of the defective servo pattern is not applied to the PLL circuit.

That is, by detecting the servo pattern on the basis of the signal except for part of the plural recording pattern detection signals $S_{Pl}$ produced at the shift register 55, the servo pattern may be detected reliably even if the phase of the clock signal $S_{CK}$ is fluctuated and the signal level of the detection signal $S_{DK}$ rises during the two clock periods 2T.

Thus the D flip flop circuit 54, the shift register circuit 55 and the comparator circuit 53 constitute recording pattern detection means for fetching the detection signal $S_{K1}$ at the timing of the clock signal $S_{CK}$ to produce the plurality of recording pattern detection signal $S_{Pl}$ in which the signal level of the detection signal $S_{K1}$ during the 24 clock periods or 24T is sequentially represented with the period T of the clock signal $S_{CK}$, and for detecting the servo pattern with the use of the signal excluding a part of the plural recording pattern detection signals.

In this manner, phase deviation of the clock signal $S_{CK}$ may be positively corrected on the basis of the results of detection by the recording pattern detection means to permit high density data recording and reproduction on or from the recording tracks of the optical disc.

In the above arrangement, the time period during which the signal level of the detection signal $S_{K1}$ is at the high level is set to 1.5 T, T being the period of the clock signal $S_{CK}$, and the servo pattern is detected using the signal except a part of the recording pattern detection signal $S_{Pl}$ in which the signal level of the detection signal $S_{K1}$ during the 24 clock periods or 24T is sequentially represented with the period T of the clock signal $S_{CK}$, so that the servo pattern may be detected positively despite occasional phase deviation of the clock signal $S_{CK}$.

Although the foregoing embodiment is concerned with the case of detecting the servo pattern on the basis of the detection signal $S_{K1}$ which rises in signal level at the zero-crossing timing of the reproduction signal $S_{RF}$, the present invention is not limited to this embodiment but may be applied for example to an optical disc apparatus in which the servo pattern is detected on the basis of the detection signal $S_{K1}$ which falls in signal level at the zero-crossing timing of the reproduction signal $S_{RF}$.

Although the foregoing embodiment is concerned with the case of raising the signal level of the detection signal $S_{K1}$ during the 1.5 clock period, this is not limitative and the time period during which the signal level is raised may be selected freely as the occasion may demand.

When the signal level of the detection signal is raised during the time period longer than, for example, two clock periods, it suffices to change the comparison standard of the comparator circuit 56 in dependence upon the length of the time period of raising the signal level.

Although the above embodiment is directed to the case of detecting the servo pattern in which the pit-to-pit interval is equal to 18 reference periods, the present invention may be applied to detection of a variety of recording patterns other than the above described servo pattern.

In addition, although the above embodiment is directed to the optical disc apparatus adapted for data recording and reproduction, the present invention may also be applied to an optical disc apparatus having only the function of reproduction, such as a compact disc player.

I claim:

1. An optical disc apparatus in which a recording pattern recorded as a predetermined period on recording tracks is detected to produce a clock signal, comprising waveform shaping means for outputting a detection signal which rises or falls in signal level for a time interval longer by a predetermined time period than the period of said clock signal, and recording pattern detection means connected to receive said detection signal at the time of an edge of said clock signal to produce a plurality of recording pattern detection signals, in which the signal level of said detecting signal for a predetermined period of time is sequentially represented pattern detection means detecting said reference pattern on a group of said plurality of recording pattern detection signals, the number of said group being less than said plurality.

2. The optical disc apparatus according to claim 1 characterized in that said predetermined time period is equal to about 0.5 T, T being the period of said clock signal.

3. The optical disc apparatus according to claim 1 characterized in that the said recording pattern of the optical disc is represented by a first level region affording a first signal level and a second level region affording a second signal level, in that said first level region is provided for a predetermined plurality of periods of said clocks and in that said second level region is provided ahead and back of said first level region for at least one period of said clock signal.

4. The optical disc apparatus according to claim 3 characterized in that said reference pattern detection means detects the recording pattern in said group in said first level region.

5. A method for processing signals in an optical disc apparatus in which the recording pattern recorded at a predetermined period on recording tracks of an optical disc is detected to produce clock signals, comprising the steps of generating a detection signal which rises or falls in signal level for a time interval longer by a predetermined time period than the period of said clock signal based on reproduced signals from the optical disc, using said detection signal at the time of an edge of said clock signal to produce a plurality of recording pattern detection signals in which the signal level of said detection signal for a predetermined period of time is sequentially represented with the periods of said clock signal, and detecting said recording pattern in a group of said recording pattern detection signals, the number of said group being less than said plurality.

6. The method for reproducing clock signals in the optical disc apparatus according to claim 5 characterized in that said predetermined period is equal to about 0.5 T, T being the period of said clock signal.

7. The method for reproducing clock signals in the optical disc apparatus according to claim 5 characterized in that detection of the recording pattern on the optical disc, in which a first level region affording a first signal level is provided for a predetermined plurality of periods of said clock signals and a second level region affording a second signal level is provided for at least one period of said clock signal ahead and back of said first level region, is performed only during said first level region.

8. An optical disc apparatus for compensating phase shift of a clock signal in reproducing a servo signal provided on tracks of an optical disc at predetermined time intervals longer than the time period of the clock signal comprising:

zero-crossing detection means for detecting a peak level of a reproduced signal from an optical head;

means for generating a first pulse from the output signal of said zero-crossing detection means, which has a pulse width which is longer than the time period T of the clock signal;

means for producing a series of second pulses in response to the first pulse and the clock signal; and means for comparing the pattern formed by said series of second pulses with the pattern of a servo signal for servo signal detection.

9. An optical disc apparatus according to claim 8, including a D flip-flop circuit for latching/unlatching the status of said first pulse based upon the clock signal.

10. An optical disc apparatus according to claim 8, wherein the pulse width of the first pulse is 1.5 times the period of the clock signal.

* * * * *